PROCESS FOR MANUFACTURING CURED MAGNETIC TAPES
UTILIZING AN ISOCYANATE ACCELERATOR

Filed Sept. 3, 1959

INVENTORS
ROBERT S. HAINES
BERNARD LELAND

BY Carl C. Kling
ATTORNEY

United States Patent Office 3,049,442
Patented Aug. 14, 1962

3,049,442

PROCESS FOR MANUFACTURING CURED MAGNETIC TAPES UTILIZING AN ISOCYANATE ACCELERATOR

Robert S. Haines and Bernard Leland, Poughkeepsie, N.Y., assignors to International Business Machines Corporation, New York, N.Y., a corporation of New York Filed Sept. 3, 1959, Ser. No. 837,954
2 Claims. (Cl. 117—119.6)

This invention relates to magnetic tapes, and particularly to a method for minimizing tape-to-head "stick" in tapes having, as a binder formulation for magnetic particles, a curable mixture of butadiene-acrylonitrile rubber and a phenolic resin.

Magnetic tapes made with binders comprising a mixture of butadiene-acrylonitrile rubber copolymers and phenol-resorcinol-formaldehyde type resins have exceptional wearability properties when exposed to the stresses of high-speed tape manipulation such as is necessary when tapes are used as computer inputs and outputs. We have found, however, that these tapes have a greater tendency to stick to magnetic heads than more conventional tapes made with vinyl chloride-acetate copolymers, especially after a temporary stop during a high speed run. When tape feeding is restarted, the binder sticks to the head. If, after a stop, the tape itself should stick to the head, the sudden pull of the drive capstan may break the tape, or the drive capstan may slip, the resulting friction causing burning and distortion of an area of tape. The tendency of the tape to stick to the head increases with the number of passes of the tape past the head, as rough particles wear off leaving greater contact area. The "stick" apparently is due to pressure flow of the binder, expedited by a "Jo-block" effect as the smooth head and wear-smoothed tape surface form molecular bonds. Static electricity may be a factor. For optimum wearability, the visco-elasticity of the magnetic particle binder layer must be sufficient to allow some flow from the retarding effect of the head, to lessen abrasion—yet the layer must return to normal thereafter, with minimum "stick."

The "stick" of the rubber and phenolic binder is inversely related to the amount of cure of the binder; flexibility is also inversely related to amount of cure. Brittleness and bonding power (grip) of the binder toward the magnetic particles are directly related to amount of cure.

Heat-curing has been utilized to control the related parameters of flexibility-"stick," and bonding power-brittleness for maximum wearability in the application prescribed. Heat-curing, for best results, requires several days during which the tape is exposed to various controlled environments of temperature, humidity, and atmosphere. Curing for ten days at 150° F., humidity and oxygen content of the atmosphere being minimized, is only partially effective; temperatures in the range of 250° F. (though for much shorter durations) are desirable to cure the phenolic portion of the binder as well as the rubber portion, but such temperatures are likely to damage the backing ribbon or web. Induction heat-curing of moving tape has been found to damage the backing web when sufficiently powerful to cure the binder.

The magnetic particles may be acicular ferric oxide particles prepared by any well-known chemical process. The web may be composed of cellulose acetate, polyethylene, or a polyethylene terepthalate plastic having suitable flexibility and non-stretch characteristic for magnetic tape. The binder is generally prepared in a batch, mixed with magnetic particles, and the mix suitably thinned with a volatile solvent. A complete formulation of a curable magnetic tape is disclosed in U.S. Patent 2,989,415, June 20, 1961, Horton and Haines, Magnetic Recording Medium and Method of Making the Same, Serial Number 703,751, filed December 19, 1957, of common assignee herewith, in which a co-inventor herein is co-inventor.

The prior art process of manufacturing cured magnetic tape is generally semi-continuous. A large roll of wide web material, which may be a foot wide and 1 mil in thickness, is fed at a controlled speed past a coating station where a mixture of magnetic particles and binder in a volatile solvent is coated onto the web. The web is then fed over festooning rollers through a heated drying unit to remove the solvent, sliced into ribbons of desired width, and then wound onto storage reels. Heat-curing is then accomplished on a batch of reels by baking in an oven for the desired time at the desired temperature. A certain percentage of the reels of tape are damaged during heat-curing, usually by buckling of the backing web. This loss during curing is reflected in higher costs of the undamaged reels.

The necessity for batch heat-curing has required a break in the continuity of the manufacturing process. The need exists, therefore, for a method and means to equal or surpass the results of heat-curing without interrupting the continuity of the manufacturing process, by accelerating the curing of the binder.

It is a primary object of the invention to provide a chemical additive for accelerating the curing of magnetic tape binders made up of rubber-phenolic mixtures.

It is a concurrent object of the invention to provide a method for inserting a chemical cure-accelerator during a continuous manufacturing process.

It is a concurrent object of the invention to provide a method for treating finished tapes with a chemical cure-accelerator.

It is a concurrent object of the invention to provide a chemical binder formulation including curable components, a cure accelerator, and an externally controllable inhibitor to prevent premature curing of the binder prior to manufacture of the tape.

SUMMARY

The curing of the rubber-phenolic binder is accelerated by the addition of an isocyanate compound accelerator in substantial amounts to the binder-magnetic particle mix. The isocyanate accelerator, even in small proportions, is so active that provision must be made to prevent premature curing of the mix, by inhibiting the action of the isocyanate prior to manufacture of the tape, or by isolating the isocyanate until such point in tape manufacture as curing is desired.

Figure 1:
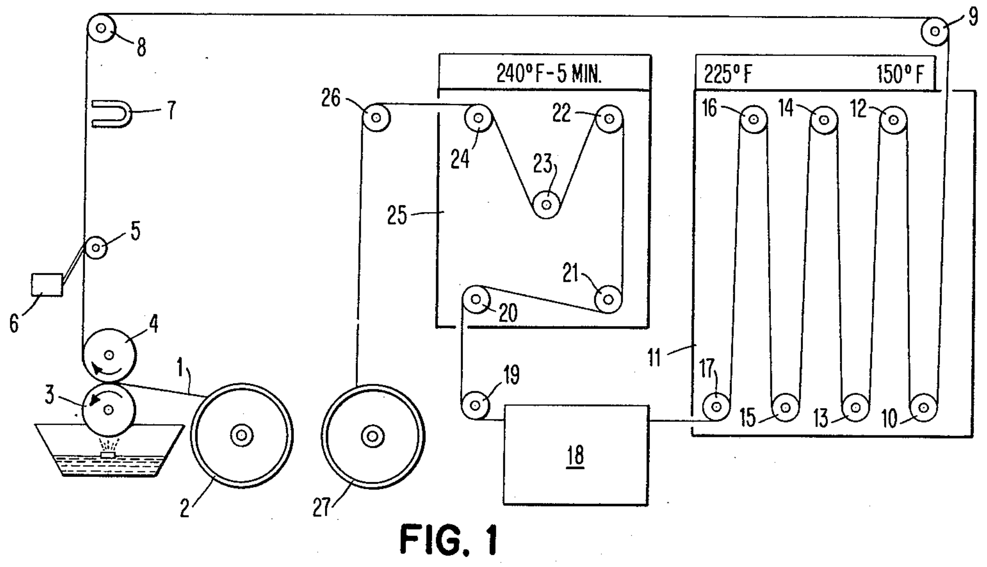
FIG. 1 is a diagram of a tape manufacturing process compatible with the invention.

*FIG. 1.—Tape Manufacturing Process*

Web stock 1 is unwound from supply reel 2, and presented to coating roller 3 as it passes over feed roller 4. The tape stock continues over backing roller 5; smoothing blade 6 smoothes the magnetic material as the tape passes over backing roller 5. Aligning magnet 7 aligns the magnetic material. Drive rollers 8, 9 and 10 carry the tape stock away from the coating station to drying oven 11. Smoothing blade 6 is the only element which contacts the magnetic side of the tape stock prior to its arrival at the drying oven. Rollers 12–17 carry the tape stock through the oven, which preferably is a variable-temperature, high air flow oven with air temperatures graduated from 150° and 225° F.

Tape stock passes out of the oven into accelerator station 18, where it is treated with accelerator in a manner to be described in detail in connection with FIGS. 2 and 3. The treated tape stock passes over roller 19, rollers 20–24 in oven 25 and over idler roller 26 onto takeup roll 27. The tape stock may at a later time be slit into ribbons of the desired width and packaged for use.

Figure 2:
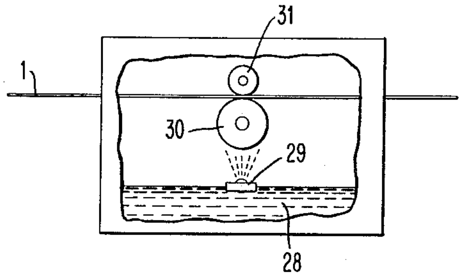
FIGS. 2 and 3 are diagrams of preferred methods of applying curing accelerator as a part of the manufacturing process.

*FIG. 2.—Fountain Roller Coater for Accelerator*

This figure illustrates a preferred accelerator station 18 of FIG. 1. Accelerator fluid 28 is pumped out of fountain 29 onto roller 30, which coats the magnetic side of the tape stock 1 with accelerator fluid. Roller 31 is a backup roller.

EXAMPLE 1.—FORMULATION AND METHOD

The active element in the accelerator is polyfunctional chalcogen-containing isocyanate compound; i.e., an isocyanate or isothiocyanate, polyfunctional isocyanate adduct, or mixture. "Chalcogen" as used herein means a member of the group (oxygen and sulfur). Mono-isocyanates are generally ineffective unless mixed with polyisocyanates. An active element preferred for its economy and convenience is methylene-bis-diphenyl-di-isocyanate,

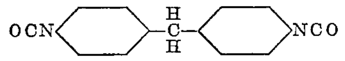

This active element is dispersed in a solvent for the binder and the isocyanate, such as toluene, methylene chloride, orthodichlorobenzene, or ethylene chloride. Water or other solvents which have substantial active oxygen by hydrogen groupings are not satisfactory. Kerosene, a poor solvent for the binder, produces a slow reaction. The solvent must not have permanent effects on the web material; it swells the binder to speed reaction, but allows the binder to return to normal after the solvent is removed.

Approximately 7.5 kilograms methylene-bis-diphenyl diisocyanate are dissolved in 92.5 kilograms toluene to form fluid accelerator 28 (FIG. 2). The tape is coated and dried in the usual fashion, then treated at accelerator station 18. The solvent causes the tape binder to swell, and allows access by the accelerator isocyanate to the long-chain polymers in the binder. The tape then passes to oven 25, where cross-linkages form rapidly while the isocyanate is in solution at the elevated temperature of 240° F. Tape exposure is 5 minutes which is sufficient to dry out the solvent and cure the binder. Further heat curing is not required—the tape manufacturing process is continuous and complete.

Figure 3:
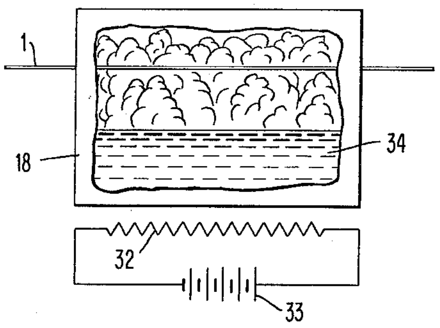
Figure 4:
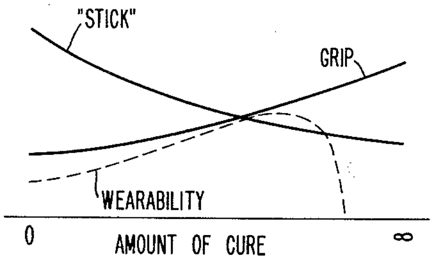
FIG. 4 is a graph of parameters of magnetic tape processed according to the invention, including "stick," grip, and wearability.

*FIG. 3.—Vapor Accelerator*

This figure illustrates a second preferred accelerator station 18 (FIG. 1). A heating element such as resistance wire 32 and current source 33 heat the station to a suitable elevated temperature at which the accelerator 34 vaporizes. Suitable felts or vapor traps (not shown) may be used to prevent vapor loss at the entrance and exit.

EXAMPLE 2.—FORMULATION AND METHOD

The active element may be vaporizable isocyanate such as commercial tolylene diisocyanate, which is 80% ortho para and 20% ortho substituted.

Two kg. commercial tolylene diisocyanate is heated to 248° F. in a 10 foot accelerator chamber (18, FIG. 1) which holds tape stock for approximately 6 seconds at manufacturing speed of 100 feet per minute. The web is coated with magnetic material, dried and passed through accelerator station 18. Oven 24 is heated to 240° F. and treats tape for 5 minutes. The tape stock is processed normally thereafter, and after 5 days at room temperature, such as normally elapse in handling and shipping, etc., the tape is ready for use. There is no break in the continuity of the manufacturing process.

*FIG. 1.—Inhibited Accelerator*

A straightforward manner of adding accelerator to the binder is to include the accelerator in the original magnetic particle-binder mix. This inclusion, however, is likely to result in premature curing of the mix, which results in a very troublesome mess which not only adheres to the container and mechanism but resists removal since it is impervious to most solvents and very abrasive. The formulation of this third embodiment of the invention includes, as a part of the mix, substantial amounts of isocyanate accelerator, but also includes sufficient proton-donor type volatile inhibitors to control the accelerator by pairing with the isocyanate. Accelerator station 18 is not used for production of magnetic tape according to this embodiment.

EXAMPLE 3.—FORMULATION AND METHOD

The accelerator is a polyfunctional chalcogen-containing isocyanate such as methylene-bis-diphenyl diisocyanate. The inhibitor is a volatile proton donor such as a chlorinated alphatic or aryl compound. Acetyl chloride and ortho-chlorobenzoyl chloride are acceptable. The accelerator and inhibitor are included in the mix, which is coated onto the tape. After coating, the inhibitor is driven off during the drying in oven 11. The tape is passed through oven 26 which is heated to 240° to treat each increment of tape for 5 minutes as the tape moves along in the unbroken manufacturing process. Since the inhibitor is driven off during the drying in oven 11, the accelerator is free to work during the heat treatment in oven 26, which treatment completes the cure as a part of the continuous manufacturing process.

The mix is made up of the following parts by weight.

3000 magnetic oxide particles (1000–6000, depending on size and weight).

1000 binder, as follows:

| | |
|---|---|
| 3–1 butadiene-acrylonitrile copolymer | 640 |
| Phenolic resin | 340 |
| Soya lecithin | 17 |
| Methyl (poly) siloxane fluid | 3 |

100 accelerator (methylene - bis - diphenyl-diisocyanate).

100 inhibitor (acetyl chloride).

This mix is not subject to premature curing during normal periods between preparation and use. Manufacture of magnetic tape according to this embodiment of the invention is a continuous process.

The weight of oxide and binder may vary widely, so long as there is sufficient binder to capture most of the particles. The amount of isocyanate accelerator is not critical. Oversupply results in a powdery dust on the surface of the tape; the proportion of isocyanate-group compound should be lowered if this dust appears. Undersupply results in insufficient cure, but appears to increase with supply up to the optimum. Combinations of heat-curing and isocyanate curing are possible, with heating times being shortened as a function of the isocyanate present. Isocyanate acceleration may also be used in conjunction with electron radiation treatment to effect curing.

The isocyanate appears to combine with the phenolic component primarily; the optimum results have been obtained with a phenolic-isocyanate relationship of 3–1. The phenolic component in the binder may vary from 10 to 70% of the weight of the binder, with an optimum near 30%. Accordingly, the isocyanate should vary from 5% (some combinations with other components occur) to 25%, with an optimum around 10%. The butadiene-acrylonitrile component varies, in complementary fashion to the phenolic component, between 85% and 25%. The inhibitor is included in sufficient amounts to control the accelerator, and varies accordingly.

ISOCYANATE-FREE ACCELERATED-CURE TAPE BINDERS

The isocyanate accelerator operates by entering into molecular crosslinkages with the phenolic components present in the tape. Faster curing components, such as low-temperature curing resin systems as a partial substitute for the phenolic component, speed the usual curing process. When the phenolic resin component is partially replaced by epoxy systems, resorcinol, resorcinol aldehyde, resorcinol-phenol aldehyde, furfural, and furfural-resorcinol the cure is speeded similarly. When the isocyanate accelerator is used in addition to these components, the amount of accelerator is proportionally reduced.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A continuous process for manufacturing cured magnetic tapes having the characteristic of extended wearability, comprising:

(*a*) preparing a coated tape by affixing to a continuously-moving backing web a dispersion in a solvent selected from the group consisting of toluene, methylene chloride, ortho-dichlorobenzene and ethylene chloride of 3000 parts magnetic oxide particles in 1000 parts of a binder consisting of:

(*a*1) 640 parts 3/1 butadiene/acrylonitrile copolymer (*a*2) 340 parts phenolic resin (*a*3) 17 parts soya lecithin (*a*4) 3 parts methyl (poly) siloxane fluid (*a*5) 100 parts methylene-bis-diphenyl-diisocyanate, a curing accelerator, and (*a*6) 100 parts volatile proton-donor inhibitor for the curing accelerator selected from the group consisting of acetyl chloride and ortho-chlorobenzoyl chloride;

(*b*) heat-drying the continuously-moving freshly-prepared tape by passing it through a high-air flow oven at temperatures below 225° F., whereby the inhibitor is driven off with the solvent; and (*c*) heat-treating the dried tape for five minutes at 240° F. to effect an accelerated copolymerization cure.

2. A continuous process for manufacturing cured magnetic tapes having the characteristic of extended wearability, comprising:

(*a*) preparing a coated tape by affixing to a continuously-moving backing web a dispersion in a solvent selected from the group consisting of toluene, methylene chloride, orthodichlorobenzene and ethylene chloride of 3000 parts magnetic oxide particles in 1000 parts of a binder consisting of:

(*a*1) 640 parts of 3/1 butadiene/acrylonitrile copolymer (*a*2) 340 parts phenolic resin (*a*3) 17 parts soya lecithin, and (*a*4) 3 parts methyl (poly) siloxane fluid;

(*b*) heat-drying the continuously-moving freshly-prepared tape by passing it through a high-air flow oven at temperatures below 225° F.;

(*c*) exposing the moving tape for six seconds to a vapor phase of commercial tolylene diisocyanate at 248° F., whereby said tolylene diisocyanate is made available to the tape binder in activated form so that molecular cross-linking occurs; and (*d*) heat-treating the dried tape for five minutes at 240° F. to effect an accelerated copolymerization cure.

References Cited in the file of this patent

UNITED STATES PATENTS

| | | |
|---|---|---|
| 2,605,248 | Fisk | July 29, 1952 |
| 2,711,901 | Von Behren | June 28, 1955 |
| 2,853,472 | Schroeder et al. | Sept. 23, 1958 |
| 2,891,983 | Bloom et al. | June 23, 1959 |
| 2,897,094 | Hayes et al. | July 28, 1959 |